US012555888B2

(12) United States Patent
Yin et al.

(10) Patent No.: US 12,555,888 B2
(45) Date of Patent: Feb. 17, 2026

(54) ANTENNA DEVICES AND SMART TELEVISIONS

(71) Applicant: SHENZHEN TCL DIGITAL TECHNOLOGY LTD., Shenzhen (CN)

(72) Inventors: Liuzhong Yin, Shenzhen (CN); Zitong Wang, Shenzhen (CN); Jiahui Luo, Shenzhen (CN)

(73) Assignee: SHENZHEN TCL DIGITAL TECHNOLOGY LTD., Guangdong (CN)

( * ) Notice: Subject to any disclaimer, the term of this patent is extended or adjusted under 35 U.S.C. 154(b) by 210 days.

(21) Appl. No.: 18/574,035

(22) PCT Filed: Apr. 29, 2022

(86) PCT No.: PCT/CN2022/090221

§ 371 (c)(1),
(2) Date: Dec. 24, 2023

(87) PCT Pub. No.: WO2023/020011

PCT Pub. Date: Feb. 23, 2023

(65) Prior Publication Data

US 2024/0297431 A1 Sep. 5, 2024

(30) Foreign Application Priority Data

Aug. 16, 2021 (CN) ........................ 202121917321.X

(51) Int. Cl.
*H01Q 1/22* (2006.01)
*H01Q 1/48* (2006.01)
(Continued)

(52) U.S. Cl.
CPC ................. *H01Q 1/22* (2013.01); *H01Q 1/48* (2013.01); *H01Q 5/50* (2015.01); *H01Q 13/10* (2013.01)

(58) Field of Classification Search
CPC .. H01Q 1/22; H01Q 1/48; H01Q 5/50; H01Q 13/10; H01Q 1/2291; H01Q 1/24; H01Q 1/38; H01Q 21/28; H01Q 1/36
See application file for complete search history.

(56) References Cited

U.S. PATENT DOCUMENTS

2008/0165065 A1* 7/2008 Hill ........................ H01Q 13/10 343/702
2018/0123242 A1* 5/2018 Jeon ......................... H01Q 5/30
(Continued)

FOREIGN PATENT DOCUMENTS

CN 204362188 U 5/2015
CN 107369881 A * 11/2017 ............ H01Q 21/28
(Continued)

OTHER PUBLICATIONS

International Search Report in International application No. PCT/CN2022/090221, mailed on Jun. 23, 2022.
(Continued)

*Primary Examiner* — Hoang V Nguyen
*Assistant Examiner* — Anna N Hamadyk
(74) *Attorney, Agent, or Firm* — PV IP PC; Wei Te Chung

(57) ABSTRACT

An embodiment of the present disclosure provides an antenna device and a smart television. The antenna device includes a substrate; a first metal layer formed with a slot to form a Bluetooth slot antenna through the slot, the first metal layer is further formed with a first notch and a second notch, the first notch and the second notch being located at both sides of the slot; a first WiFi antenna located at the first notch; a second WiFi antenna located at the second notch.

18 Claims, 2 Drawing Sheets

(51) Int. Cl.

| | |
|---|---|
| ***H01Q 5/50*** | (2015.01) |
| ***H01Q 13/10*** | (2006.01) |

(56) References Cited

U.S. PATENT DOCUMENTS

| | | | | |
|---|---|---|---|---|
| 2018/0287259 | A1 | 10/2018 | Svendsen et al. | |
| 2021/0265719 | A1 * | 8/2021 | Wang .................. | H05K 1/0243 |

FOREIGN PATENT DOCUMENTS

| | | | | |
|---|---|---|---|---|
| CN | 207338619 | U | 5/2018 | |
| CN | 208675427 | U | 3/2019 | |
| CN | 215933824 | U | 3/2022 | |
| EP | 3244486 | A1 * | 11/2017 | ............. H01Q 13/10 |
| JP | 2014192768 | A | 10/2014 | |

OTHER PUBLICATIONS

Written Opinion of the International Search Authority in International application No. PCT/CN2022/090221, mailed on Jun. 23, 2022.

* cited by examiner

ANTENNA DEVICES AND SMART TELEVISIONS

This application claims priority to Chinese Patent Application No. 202121917321.X, filed in the China National Intellectual Property Administration on Aug. 16, 2021, entitled "ANTENNA DEVICE AND SMART TELEVISION", the entire contents of which are incorporated herein by reference.

TECHNICAL FIELD

The present disclosure relates to a field of communication technology, and more particularly, to antenna devices and smart televisions.

BACKGROUND

Smart televisions are typically provided with WiFi antennas and Bluetooth antennas for implementing WiFi communication functions and Bluetooth communication functions. For example, the smart television may implement WiFi communication with a router through the WiFi antenna and Bluetooth communication with a smartphone through the Bluetooth antenna.

SUMMARY

Technical Problem

At present, the design of smart television is becoming more and more thin, and the space available for laying out antennas in smart television is becoming smaller and smaller. Therefore, how to design the antenna of the smart television in a limited space becomes a problem.

Solution to Technical Problem

Technical Solution

Embodiments of the present disclosure provide antenna devices and smart televisions, which may reduce the overall size of the antenna device, thereby reducing the layout space occupied by the antenna device in the smart television.

An embodiment of the present disclosure provides an antenna device including:

- a substrate;
- a first metal layer disposed on a first surface of the substrate, the first metal layer is formed with a slot to form a Bluetooth slot antenna through the slot, the first metal layer is further formed with a first notch and a second notch, the first notch and the second notch are located at both sides of the slot;
- a first WiFi antenna disposed on the substrate, the first WiFi antenna is located at the first notch; and
- a second WiFi antenna disposed on the substrate, the second WiFi antenna is located at the second notch.

In some embodiments, a portion of the first metal layer between the slot and the first notch forms a first projection, a portion of the first metal layer between the slot and the second notch forms a second projection, and both the first projection and the second projection are grounded.

In some embodiments, the antenna device further includes a first metal fixing structure and a second metal fixing structure, both the first metal fixing structure and the second metal fixing structure are grounded, the first projection is connected to the first metal fixing structure for grounding, and the second projection is connected to the second metal fixing structure for grounding.

In some embodiments, the first metal layer forms a third projection at an end of the first notch away from the slot, the first metal layer forms a fourth projection at an end of the second notch away from the slot, and both the third projection and the fourth projection are grounded.

In some embodiments, the antenna device further includes a third metal fixing structure and a fourth metal fixing structure, the third metal fixing structure and the fourth metal fixing structure are both grounded, the third projection is connected to the third metal fixing structure for grounding, and the fourth projection is connected to the fourth metal fixing structure for grounding.

In some embodiments, the first WiFi antenna, the Bluetooth slot antenna, and the second WiFi antenna are in a linear layout.

In some embodiments, the first WiFi antenna and the second WiFi antenna are both printed inside the substrate or on the first surface of the substrate.

In some embodiments, the antenna device further includes a second metal layer disposed on a second surface of the substrate, the second surface is opposite to the first surface.

In some embodiments, each of regions of the second metal layer corresponding to the slot, the first notch, and the second notch is hollowed out.

In some embodiments, the antenna device further includes a first radio frequency coaxial cable, a second radio frequency coaxial cable, and a third radio frequency coaxial cable, the first radio frequency coaxial cable, the second radio frequency coaxial cable, and the third radio frequency coaxial cable are all disposed on and electrically insulated from the second metal layer, the first radio frequency coaxial cable is electrically connected to the first WiFi antenna, the second radio frequency coaxial cable is electrically connected to the Bluetooth slot antenna, and the third radio frequency coaxial cable is electrically connected to the second WiFi antenna.

In some embodiments, the antenna device further includes a WiFi signal source and a Bluetooth signal source, both the first radio frequency coaxial cable and the third radio frequency coaxial cable are electrically connected to the WiFi signal source, and the second radio frequency coaxial cable is electrically connected to the Bluetooth signal source.

An embodiment of the present disclosure further provides a smart television including:

- a television main body; and
- an antenna device mounted to the television main body, the antenna device including:
- a substrate;
- a first metal layer disposed on a first surface of the substrate, the first metal layer is formed with a slot to form a Bluetooth slot antenna through the slot, the first metal layer is further formed with a first notch and a second notch, the first notch and the second notch are located at both sides of the slot;
- a first WiFi antenna disposed on the substrate, the first WiFi antenna is located at the first notch; and
- a second WiFi antenna disposed on the substrate, the second WiFi antenna is located at the second notch.

In some embodiments, the television main body includes a metal backing plate and a base connected to the metal backing plate, the antenna device is mounted to the base, and the antenna device and the metal backing plate are commonly grounded so that the antenna device and the metal backing plate form a radiation whole structure.

In some embodiments, according to the smart television described above, a portion of the first metal layer between the slot and the first notch forms a first projection, a portion of the first metal layer between the slot and the second notch forms a second projection, and both the first projection and the second projection are grounded.

In some embodiments, according to the smart television described above, the antenna device further includes a first metal fixing structure and a second metal fixing structure, both the first metal fixing structure and the second metal fixing structure are grounded, the first projection is connected to the first metal fixing structure for grounding, and the second projection is connected to the second metal fixing structure for grounding.

In some embodiments, according to the smart television described above, the first metal layer forms a third projection at an end of the first notch away from the slot, the first metal layer forms a fourth projection at an end of the second notch away from the slot, and both the third projection and the fourth projection are grounded.

In some embodiments, according to the smart television described above, the antenna device further includes a third metal fixing structure and a fourth metal fixing structure, both the third metal fixing structure and the fourth metal fixing structure are grounded, the third projection is connected to the third metal fixing structure for grounding, and the fourth projection is connected to the fourth metal fixing structure for grounding.

In some embodiments, according to the smart television described above, the first WiFi antenna, the Bluetooth slot antenna, and the second WiFi antenna are in a linear layout.

In some embodiments, according to the smart television described above, the first WiFi antenna and the second WiFi antenna are both printed inside the substrate or on the first surface of the substrate.

In some embodiments, according to the smart television described above, the antenna device further includes a second metal layer disposed on a second surface of the substrate, the second surface is opposite to the first surface.

Advantages of Invention

Beneficial Effect

According to the antenna device provided in the embodiment of the present disclosure, a Bluetooth slot antenna is formed through a slot in a first metal layer, a first WiFi antenna is disposed at a first notch in the first metal layer, and a second WiFi antenna is disposed at a second notch in the first metal layer. Therefore, a compact layout of the Bluetooth antenna and the two WiFi antennas may be realized, thereby reducing the overall size of the antenna device, so as to reduce the occupation of the antenna layout space by the antenna device.

BRIEF DESCRIPTION OF THE DRAWINGS

Description of Drawings

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings FIG. 1 is a schematic structural diagram of an antenna device according to an embodiment of the present disclosure.

Figure 1:
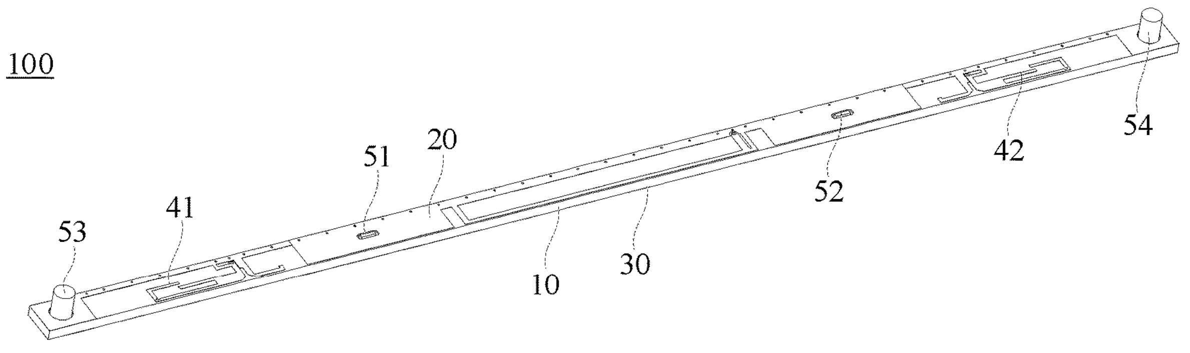
Figure 2:
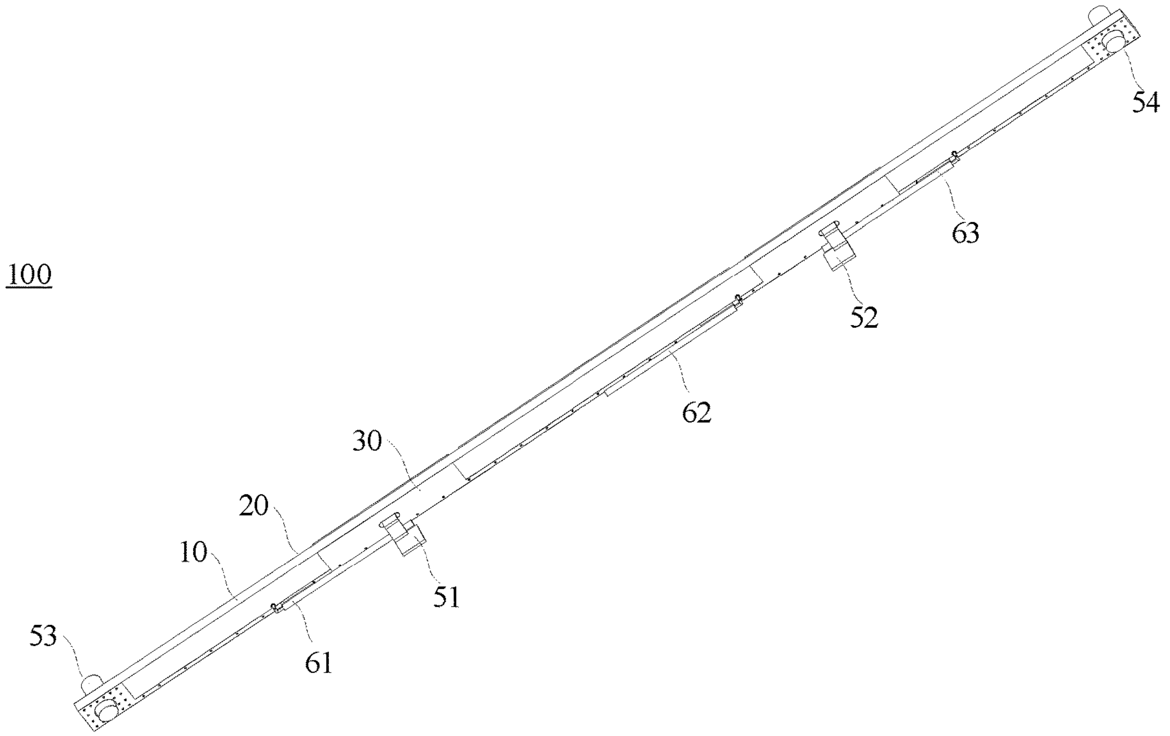

FIG. 2 is a schematic structural diagram from another viewing angle of the antenna device shown in FIG. 1.

Figure 3:
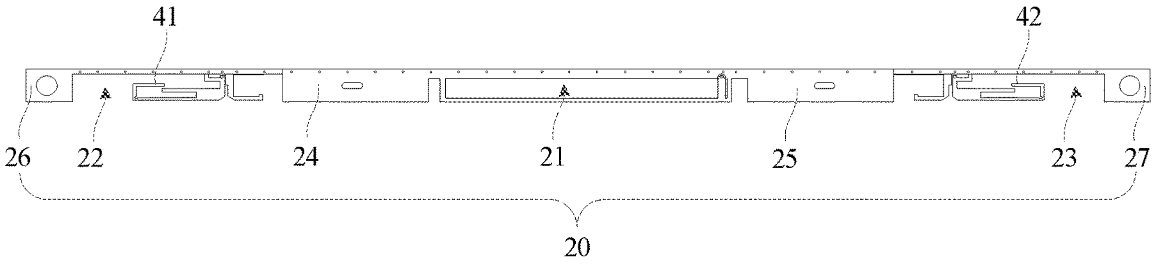

FIG. 3 is a schematic structural diagram of a first metal layer, a first WiFi antenna, and a second WiFi antenna of the antenna device shown in FIG. 1.

Figure 4:
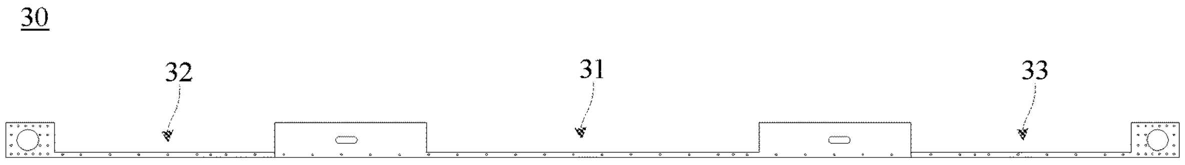

FIG. 4 is a schematic structural diagram of a second metal layer of the antenna device shown in FIG. 1.

Figure 5:
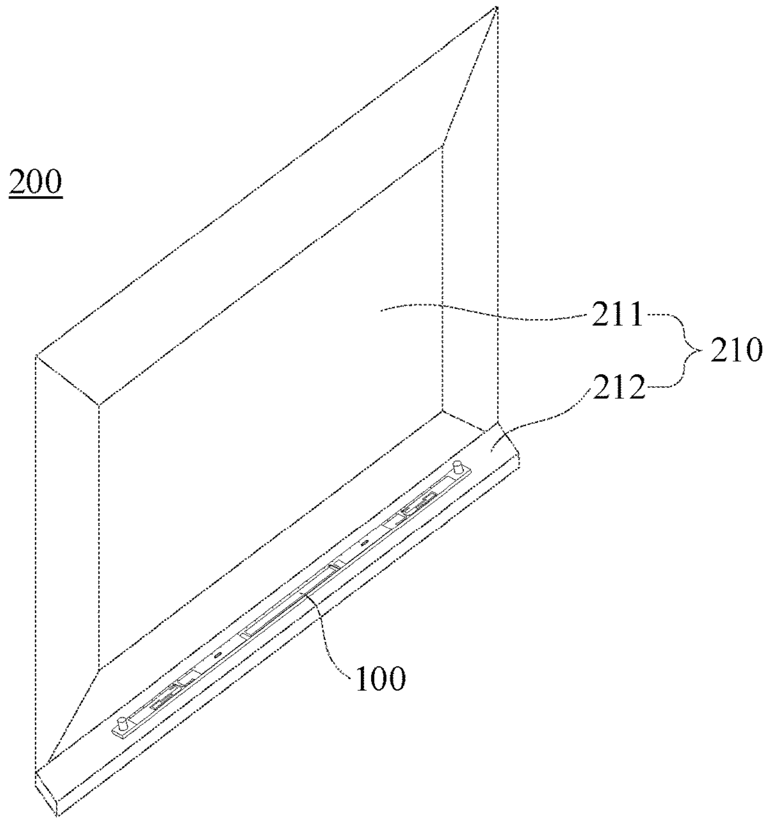

FIG. 5 is a schematic structural diagram of a smart television according to an embodiment of the present disclosure.

EMBODIMENTS OF INVENTION

Detailed Description

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

Embodiments of the present disclosure provide an antenna device that may be provided in a smart television to enable wireless communication of the smart television, such as WiFi communication and Bluetooth communication of the smart television.

Referring to FIGS. 1 and 2, FIG. 1 is a schematic structural diagram of an antenna device 100 according to an embodiment of the present disclosure, and FIG. 2 is a schematic structural diagram from another viewing angle of the antenna device 100 shown in FIG. 1.

The antenna device 100 includes a substrate 10, a first metal layer 20, and a second metal layer 30. The first metal layer 20 and the second metal layer 30 are disposed on two opposite surfaces of the substrate 10. For example, the first metal layer 20 may be disposed on a first surface of the substrate 10, and the second metal layer 30 may be disposed on a second surface of the substrate 10 opposite to the first surface. It may be appreciated that in some embodiments, the first metal layer 20 and the second metal layer 30 may be copper plated layers disposed on two opposite surfaces of the substrate 10.

In practical examples, the substrate 10 may be a substrate formed of FR4 epoxy. The thickness of the substrate 10 may be 1 mm. The overall shape of the substrate 10 may be rectangular, and the size of the substrate 10 may be 135 mm*5 mm. The thickness of the first metal layer 20 or the second metal layer 30 may be 0.5~1 ounces.

In an embodiment of the present disclosure, a Bluetooth antenna is formed on the first metal layer 20, and the Bluetooth antenna is configured to implement Bluetooth communication. The antenna device 100 further includes a first WiFi antenna 41 and a second WiFi antenna 42, and the first WiFi antenna 41 and the second WiFi antenna 42 are configured to implement WiFi communication.

Referring to FIG. 3, FIG. 3 is a schematic structural diagram of the first metal layer 20, the first WiFi antenna 41, and the second WiFi antenna 42 of the antenna device shown in FIG. 1.

The first metal layer 20 is formed with a slot 21 to form a Bluetooth slot antenna through the slot 21. It may be appreciated that, in practical applications, the slot 21 may be a miniature rectangular slot so that a Bluetooth signal may be radiated outwardly through a metal layer around the miniature rectangular slot, thereby forming the Bluetooth slot antenna.

In a practical example, the Bluetooth slot antenna formed by the slot 21 may be a magnetic current antenna. Therefore, when the formed Bluetooth slot antenna is horizontally placed, vertical polarization may be obtained so that the Bluetooth beam width is within ±20° in a forward direction, and the horizontal directional radiation requirement is satisfied.

The first metal layer 20 is also formed with a first notch 22 and a second notch 23. The first notch 22 and the second notch 23 are located on both sides of the slot 21. In some embodiments, the first notch 22, the slot 21, and the second notch 23 may be arranged in a straight line.

Each of the first WiFi antenna 41 and the second WiFi antenna 42 is provided on the substrate 10. The first WiFi antenna 41 is located in the first notch 22. The second WiFi antenna 42 is located in the second notch 23. Both the first WiFi antenna 41 and the second WiFi antenna 42 may be PIFA antennas (planar inverted-F antennas).

In some embodiments, the first WiFi antenna 41 and the second WiFi antenna 42 are both printed inside or on a surface of the substrate 10, e.g., on a first surface of the substrate 10. When the first WiFi antenna 41 and the second WiFi antenna 42 are printed inside of the substrate 10, the substrate 10 may be designed as a multilayer structure, and the first WiFi antenna 41 and the second WiFi antenna 42 may be printed on the bonding surface of the multilayer structure. It may be appreciated that when the first WiFi antenna 41 and the second WiFi antenna 42 are printed inside of the substrate 10, the first WiFi antenna 41 and the second WiFi antenna 42 may be miniaturized by a wavelength shortening effect of the substrate 10 with a high dielectric constant, thereby reducing the size of the first WiFi antenna 41 and the second WiFi antenna 42.

It may be appreciated that in practical applications, the first WiFi antenna 41 may be connected to the first metal layer 20 at the first notch 22 to perform functions such as grounding. Similarly, the second WiFi antenna 42 may be connected to the first metal layer 20 at the second notch 23 to perform functions such as grounding.

In some embodiments, the first WiFi antenna 41, the Bluetooth slot antenna formed by the slot 21, and the second WiFi antenna 42 may be in a linear layout. For example, when the first notch 22, the slot 21, and the second notch 23 are arranged in a straight line, the first WiFi antenna 41, the Bluetooth slot antenna, and the second WiFi antenna 42 may be arranged in a straight line.

It may be appreciated that when the first WiFi antenna 41, the Bluetooth slot antenna, and the second WiFi antenna 42 are in a linear layout, the gain on both sides of the Bluetooth slot antenna is the lowest, so that a mutual signal receiving capability between the Bluetooth slot antenna and the WiFi antennas on both sides of the Bluetooth slot antenna is the weakest, and therefore the isolation between the three antennas may be improved, thereby improving the anti-interference capability of the Bluetooth slot antenna and the WiFi antenna.

In some embodiments, continuing with reference to FIG. 3, a portion of the first metal layer 20 between the slot 21 and the first notch 22 forms a first projection 24, and a portion of the first metal layer 20 between the slot 21 and the second notch 23 forms a second projection 25. The first projection 24 and the second projection 25 are both grounded.

It may be appreciated that the first projection 24, the second projection 25 are grounded, that is, the portion between the slot 21 and the first notch 22, and the portion between the slot 21 and the second notch 23 are grounded, so that a zero potential region may be formed between the first WiFi antenna 41 and the Bluetooth slot antenna formed by the slot 21, and a zero potential region may be formed between the second WiFi antenna 42 and the Bluetooth slot antenna formed by the slot 21. Therefore, it is possible to further reduce the mutual signal receiving capability between the Bluetooth slot antenna and the WiFi antennas on both sides of the Bluetooth slot antenna, thereby further improving the isolation between the three antennas.

In some embodiments, continuing with reference to FIGS. 1 and 2, the antenna device 100 further includes a first metal fixing structure 51 and a second metal fixing structure 52. The first metal fixing structure 51 and the second metal fixing structure 52 are both grounded. For example, the first metal fixing structure 51 and the second metal fixing structure 52 may be connected to system ground. The first projection 24 is connected to the first metal fixing structure 51 for grounding, and the second projection 25 is connected to the second metal fixing structure 52 for grounding.

It may be appreciated that in practical applications, each of the first metal fixing structure 51 and the second metal fixing structure 52 may be a metal conductive post, a metal sheet, or the like.

In some embodiments, continuing with reference to FIG. 3, the first metal layer 20 forms a third projection 26 at an end of the first notch 22 away from the slot 21, and the first metal layer 20 forms a fourth projection 27 at an end of the second notch 23 away from the slot 21. The third projection 26 and the fourth projection 27 are both grounded.

It may be appreciated that the third projection 26 and the fourth projection 27 are both grounded, that is, grounding structures are formed at both sides of each of the first WiFi antenna 41 and the second WiFi antenna 42, and the zero potential regions may be formed at both sides of each of the first WiFi antenna 41 and the second WiFi antenna 42. Therefore, external interference to the first WiFi antenna 41 and the second WiFi antenna 42 may be reduced, and the anti-interference capability of the first WiFi antenna 41 and the second WiFi antenna 42 may be improved.

In some embodiments, continuing with reference to FIGS. 1 and 2, the antenna device 100 further includes a third metal fixing structure 53 and a fourth metal fixing structure 54. The third metal fixing structure 53 and the fourth metal fixing structure 54 are both grounded, for example, the third metal fixing structure 53 and the fourth metal fixing structure 54 may be connected to the system ground. The third projection 26 is connected to the third metal fixing structure 53 for grounding, and the fourth projection 27 is connected to the fourth metal fixing structure 54 for grounding.

It may be appreciated that in practical applications, each of the third metal fixing structure 53 and the fourth metal fixing structure 54 may be a metal conductive post, a metal sheet, or the like.

In some embodiments, referring to FIG. 4, FIG. 4 is a schematic structural diagram of the second metal layer 30 of the antenna device shown in FIG. 1.

Each of regions of the second metal layer 30 corresponding to the slot 21, the first notch 22, and the second notch 23 of the first metal layer 20 is hollowed out. For example, the region of the second metal layer 30 corresponding to the first slot 21 is hollowed out to form a first hollow region 31, the region of the second metal layer 30 corresponding to the first notch 22 is hollowed out to form a second hollow region 32, and the region of the second metal layer 30 corresponding to the second notch 23 is hollowed out to form a third hollow region 33.

It may be appreciated that the first hollow region 31 may form a clearance region of the Bluetooth slot antenna, the second hollow region 32 may form a clearance region of the first WiFi antenna 41, and the third hollow region 33 may form a clearance region of the second WiFi antenna 42. Therefore, the radiation efficiency of the Bluetooth signal and the WiFi signal may be improved.

In some embodiments, continuing with reference to FIG. 2, the antenna device 100 further includes a first radio frequency coaxial cable 61, a second radio frequency coaxial cable 62, and a third radio frequency coaxial cable 63. The first radio frequency coaxial cable 61, the second radio frequency coaxial cable 62, and the third radio frequency coaxial cable 63 are all disposed on and electrically insulated from the second metal layer 30.

The first radio frequency coaxial cable 61 is electrically connected to the first WiFi antenna 41, the second radio frequency coaxial cable 62 is electrically connected to the Bluetooth slot antenna formed by the slot 21, and the third radio frequency coaxial cable 63 is electrically connected to the second WiFi antenna 42. It may be appreciated that the first radio frequency coaxial cable 61 and the third radio frequency coaxial cable 63 may be configured to transmit a WiFi excitation signal, thereby realizing a feed for the first WiFi antenna 41 and the second WiFi antenna 42. The second radio frequency coaxial cable 62 may be configured to transmit a Bluetooth excitation signal to realize a feed for the Bluetooth slot antenna.

It may be appreciated that in practical application, the antenna device 100 also includes a WiFi signal source and a Bluetooth signal source. The WiFi signal source and the Bluetooth signal source may be provided on the substrate 10, or may be provided separately, for example, as a WiFi chip and a Bluetooth chip.

Each of the first radio frequency coaxial cable 61 and the third radio frequency coaxial cable 63 is electrically connected to the WiFi signal source, so that a WiFi excitation signal is fed into each of the first WiFi antenna 41 and the second WiFi antenna 42. The second radio frequency coaxial cable 62 is electrically connected to the Bluetooth signal source so as to feed the Bluetooth excitation signal to the Bluetooth slot antenna.

According to the antenna device 100 provided in the embodiment of the present disclosure, the Bluetooth slot antenna is formed through the slot 21 in the first metal layer 20, the first WiFi antenna 41 is disposed at the first notch 22 in the first metal layer 20, and the second WiFi antenna 42 is disposed at the second notch 23 in the first metal layer 20, so that a compact layout of the Bluetooth antenna and the two WiFi antennas may be realized, thereby reducing the overall size of the antenna device 100, so as to reduce the occupation of the antenna layout space by the antenna device 100.

An embodiment of the present disclosure also provides a smart television, such as the smart television 200 shown in FIG. 5. FIG. 5 is a schematic structural diagram of the smart television 200 according to an embodiment of the present disclosure.

The smart television 200 includes a television main body 210 and an antenna device 100 mounted to the television main body 210. The television main body 210 is configured to implement a playback function. The antenna device 100 is configured to implement wireless communication functions, such as a Bluetooth communication function and a WiFi communication function.

In some embodiments, television main body 210 includes a metal backing plate 211 and a base 212 connected to metal backing plate 211. The metal backing plate 211 may be made of, for example, aluminum alloy or the like, and the base 212 may be made of, for example, plastic.

The antenna device 100 is mounted on the base 212 so that the plane in which the slot 21 of the first metal layer 20 is located is orthogonal to the plane in which the metal backing plate 211 is located, thereby enabling the Bluetooth slot antenna formed by the slot 21 to operate normally. The antenna device 100 and the metal backing plate 211 are jointly grounded, so that the antenna device 100 and the metal backing plate 211 form a radiation whole structure. For example, the first metal fixing structure 51 and the second metal fixing structure 52 of the antenna device 100 may be connected to the metal backing plate 211 and connected to the system ground to realize common grounding. It may be appreciated that the antenna device 100 and the metal backing plate 211 may also be commonly grounded by other means, such as by a wire connection, and commonly connected to the system ground.

It may be appreciated that when the antenna device 100 and the metal backing plate 211 form the radiation whole structure, on the one hand, interference of the metal backing plate 211 to the Bluetooth signal and the WiFi signal radiated by the antenna device 100 may be avoided, and on the other hand, the gain of the Bluetooth signal and the WiFi signal may be improved by the radiation action of the metal backing plate 211, thereby improving the radiation efficiency of the Bluetooth signal and the WiFi signal.

In the description of the present disclosure, it is to be understood that the term, such as "first", "second", and the like, are only used to distinguish similar objects, and cannot be construed as indicating or imposing a relative importance or implicitly indicating the number of technical features indicated.

The antenna device and the smart television provided by the embodiment of the present disclosure are described in detail above. The principles and embodiments of the present disclosure have been described with reference to specific embodiments, and the description of the above embodiments is merely intended to aid in the understanding of the present disclosure. At the same time, changes may be made by those skilled in the art to both the specific implementations and the scope of application in accordance with the teachings of the present disclosure. In view of the foregoing, the content of the present specification should not be construed as limiting the disclosure.

What is claimed is:

1. An antenna device comprising: a substrate; a first metal layer disposed on a first surface of the substrate, the first metal layer being formed with a slot to form a Bluetooth slot antenna through the slot, the first metal layer being further formed with a first notch and a second notch; wherein the first notch is located at one side of the slot, and the second notch is located at another side of the slot; a first WiFi antenna disposed on the substrate, the first WiFi antenna being located at the first notch;and a second WiFi antenna disposed on the substrate, the second WiFi antenna being located at the second notch; wherein a portion of the first metal layer between the slot and the first notch forms a first projection, a portion of the first metal layer between the slot and the second notch forms a second projection, and both the first projection and the second projection are grounded.

2. The antenna device according to claim 1, further comprising a first metal fixing structure and a second metal fixing structure, wherein both the first metal fixing structure and the second metal fixing structure are grounded, the first projection is connected to the first metal fixing structure for grounding, and the second projection is connected to the second metal fixing structure for grounding.

3. The antenna device according to claim 1, wherein the first metal layer forms a third projection at an end of the first notch away from the slot, the first metal layer forms a fourth projection at an end of the second notch away from the slot, and both the third projection and the fourth projection are grounded.

4. The antenna device according to claim 3, further comprising a third metal fixing structure and a fourth metal fixing structure, wherein the third metal fixing structure and the fourth metal fixing structure are both grounded, the third projection is connected to the third metal fixing structure for grounding, and the fourth projection is connected to the fourth metal fixing structure for grounding.

5. The antenna device according to claim 1, wherein the first WiFi antenna, the Bluetooth slot antenna, and the second WiFi antenna are in a linear layout.

6. The antenna device according to claim 1, wherein the first WiFi antenna and the second WiFi antenna are both printed inside the substrate or on the first surface of the substrate.

7. The antenna device according to claim 1, further comprising a second metal layer disposed on a second surface of the substrate, the second surface being opposite to the first surface.

8. The antenna device according to claim 7, wherein each of regions of the second metal layer corresponding to the slot, the first notch, and the second notch is hollowed out.

9. The antenna device according to claim 7, further comprising a first radio frequency coaxial cable, a second radio frequency coaxial cable, and a third radio frequency coaxial cable, wherein the first radio frequency coaxial cable, the second radio frequency coaxial cable, and the third radio frequency coaxial cable are all disposed on and electrically insulated from the second metal layer, the first radio frequency coaxial cable is electrically connected to the first WiFi antenna, the second radio frequency coaxial cable is electrically connected to the Bluetooth slot antenna, and the third radio frequency coaxial cable is electrically connected to the second WiFi antenna.

10. The antenna device according to claim 9, further comprising a WiFi signal source and a Bluetooth signal source, wherein both the first radio frequency coaxial cable and the third radio frequency coaxial cable are electrically connected to the WiFi signal source, and the second radio frequency coaxial cable is electrically connected to the Bluetooth signal source.

11. A smart television comprising: a television main body; and an antenna device mounted to the television main body, the antenna device comprising: a substrate; a first metal layer disposed on a first surface of the substrate, the first metal layer being formed with a slot to form a Bluetooth slot antenna through the slot, the first metal layer being further formed with a first notch and a second notch; wherein the first notch is located at one side of the slot, and the second notch is located at another side of the slot; a first WiFi antenna disposed on the substrate, the first WiFi antenna being located at the first notch; and a second WiFi antenna disposed on the substrate, the second WiFi antenna being located at the second notch; wherein a portion of the first metal layer between the slot and the first notch forms a first projection, a portion of the first metal layer between the slot and the second notch forms a second projection, and both the first projection and the second projection are grounded.

12. The smart television according to claim 11, wherein the television main body comprises a metal backing plate and a base connected to the metal backing plate, the antenna device is mounted to the base, a plane in which the slot of the first metal layer is located is orthogonal to a plane in which the metal backing plate is located, and the antenna device and the metal backing plate are commonly grounded so that the antenna device and the metal backing plate form a radiation whole structure.

13. The smart television according to claim 11, wherein the antenna device further comprises a first metal fixing structure and a second metal fixing structure, both the first metal fixing structure and the second metal fixing structure are grounded, the first projection is connected to the first metal fixing structure for grounding, and the second projection is connected to the second metal fixing structure for grounding.

14. The smart television according to claim 11, wherein the first metal layer forms a third projection at an end of the first notch away from the slot, the first metal layer forms a fourth projection at an end of the second notch away from the slot, and both the third projection and the fourth projection are grounded.

15. The smart television according to claim 14, wherein the antenna device further comprises a third metal fixing structure and a fourth metal fixing structure, both the third metal fixing structure and the fourth metal fixing structure are grounded, the third projection is connected to the third metal fixing structure for grounding, and the fourth projection is connected to the fourth metal fixing structure for grounding.

16. The smart television according to claim 11, wherein the first WiFi antenna, the Bluetooth slot antenna, and the second WiFi antenna are in a linear layout.

17. The smart television according to claim 11, wherein the first WiFi antenna and the second WiFi antenna are both printed inside the substrate or on the first surface of the substrate.

18. The smart television according to claim 11, wherein the antenna device further comprises a second metal layer disposed on a second surface of the substrate, the second surface is opposite to the first surface.

* * * * *